(12) United States Patent
Liu et al.

(10) Patent No.: US 12,546,394 B2
(45) Date of Patent: Feb. 10, 2026

(54) SEALING DEVICE

(71) Applicant: Schaeffler Technologies AG & Co. KG, Herzogenaurach (DE)

(72) Inventors: Xin Liu, Shanghai (CN); Lijuan Wu, Suzhou (CN); Lai Wei, Shanghai (CN); Jianfei Wei, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/837,094

(22) PCT Filed: Feb. 8, 2022

(86) PCT No.: PCT/CN2022/075535
§ 371 (c)(1),
(2) Date: Aug. 8, 2024

(87) PCT Pub. No.: WO2023/150913
PCT Pub. Date: Aug. 17, 2023

(65) Prior Publication Data
US 2025/0146574 A1   May 8, 2025

(51) Int. Cl.
*F16J 15/3204* (2016.01)
(52) U.S. Cl.
CPC ................. *F16J 15/3204* (2013.01)
(58) Field of Classification Search
CPC .... F16J 15/326; F16J 15/3204; F16J 15/3492; F16J 15/3296
See application file for complete search history.

(56) References Cited

U.S. PATENT DOCUMENTS 5,246,235 A * 9/1993 Heinzen ............... F16J 15/16
                                                        277/321
5,611,548 A   3/1997 Dahlhaus
(Continued)

FOREIGN PATENT DOCUMENTS

CN    102691795 A       9/2012
CN    105953062 A *     9/2016 ............. F16N 29/04
(Continued)

OTHER PUBLICATIONS

Chinese Patent Office, International Search Report received in International Application No. PCT/CN2022/075535, Nov. 14, 2022, 8 pages.
(Continued)

*Primary Examiner* — Eugene G Byrd
(74) *Attorney, Agent, or Firm* — Suiter Swantz IP (57) ABSTRACT

A sealing device, comprising includes a sealing ring including a sealing lip composed of an insulating elastic material for forming dynamic sealing with respect to a conductive component; a support body fixed on the sealing ring along the circumferential direction of the sealing ring, and a first detection unit comprising two first support bodies in the support body, first cables respectively electrically connected to the corresponding first support bodies, and a loop detection device electrically connected to the first cables, wherein the first support bodies are arranged at the sealing ring such that radial ends of the first support bodies close to the conductive component are covered with the insulating elastic material at the sealing lip and can directly contact the conductive component after the sealing lip is worn. The two first support bodies, the conductive component, the loop detection device, and the first cables jointly form a communication loop.

18 Claims, 4 Drawing Sheets

(56) References Cited

U.S. PATENT DOCUMENTS

| | | | | |
|---|---|---|---|---|
| 5,648,614 | A | * | 7/1997 | Martsfeld ............... F16J 15/326 73/726 |
| 6,003,872 | A | * | 12/1999 | Nord .................... G01M 3/183 277/321 |
| 6,615,639 | B1 | | 9/2003 | Heinzen |
| 9,541,199 | B2 | * | 1/2017 | Rust .................... F16J 15/3236 |
| 10,788,381 | B2 | * | 9/2020 | Lang ................... F16J 15/3296 |
| 12,173,798 | B2 | * | 12/2024 | Karjalainen ........... F16J 15/322 |
| 2004/0232619 | A1 | * | 11/2004 | Bock ................... G01M 3/183 277/317 |
| 2007/0200300 | A1 | * | 8/2007 | Lutaud ................ F16J 15/3204 277/549 |
| 2012/0267848 | A1 | | 10/2012 | Saito |
| 2018/0112779 | A1 | * | 4/2018 | Nahrwold ........... F16J 15/3296 |
| 2018/0274682 | A1 | * | 9/2018 | Shimizu ............. F16J 15/3296 |
| 2019/0040959 | A1 | * | 2/2019 | Sommers ............. F01D 21/003 |
| 2020/0047300 | A1 | | 2/2020 | Vorpahl |
| 2020/0124180 | A1 | * | 4/2020 | Korupp ................ F16J 15/022 |
| 2022/0403935 | A1 | * | 12/2022 | Lauer .................. F16J 15/3296 |

FOREIGN PATENT DOCUMENTS

| | | | | |
|---|---|---|---|---|
| CN | 110832234 | A | | 2/2020 |
| CN | 113028063 | A * | 6/2021 | .......... F16C 33/7816 |
| CN | 113653802 | A | | 11/2021 |
| DE | 102016010926 | A1 * | 9/2017 | .............. F16C 19/52 |
| DE | 102018105393 | B | | 2/2019 |
| DE | 102018000935 | A1 | | 5/2019 |
| DE | 102018104753 | A1 | | 9/2019 |
| EP | 3450803 | B1 | | 3/2020 |
| JP | 6326186 | B1 * | 5/2018 | .......... F16J 15/3204 |
| JP | 2021148251 | A | | 9/2021 |
| WO | WO-2015169795 | A1 * | 11/2015 | .......... F16J 15/3456 |

OTHER PUBLICATIONS

Traber, "Sensor or seal?" Process Technology Online, Chemical Production Plants Processes, Oct. 24, 2018, 4 pages.

European Patent Office, Extended European Search Report received in EP Application No. 22925278.8, Jul. 29, 2025, 10 pages (including translation).

* cited by examiner

SEALING DEVICE

CROSS-REFERENCE TO RELATED APPLICATION

The present application is the U.S. National Phase of PCT Patent Application Number PCT/CN2022/075535, filed on Feb. 8, 2022, the entire disclosure of which is incorporated by reference herein.

TECHNICAL FIELD

The present application relates to the technical field of sealing. The present application specifically relates to a sealing device particularly used for a wind turbine bearing.

BACKGROUND ART

Wind turbine bearings are important constituent parts of wind turbine generators. To enable the wind turbine generators to operate stably, the wind turbine bearings need to be sealed. At present, common sealing structures on the wind turbine bearings are rubber sealing rings with fabrics, and the sealing rings are configured with sealing lips for forming dynamic sealing. However, since rotational speeds of fan bearings are too low, this type of sealing devices cannot yield a pumping effect of typical oil seals. Therefore, the sealing effect is poor. In addition, the fan bearings have large sizes, and diameters thereof may be between one meter and more than ten meters. Therefore, on the one hand, due to a high degree of eccentricity and poor flexibility, existing sealing devices cannot well match large-sized wind turbine bearings; and on the other hand, the solution of using a spring coil to provide a radial force to solve the problem of eccentricity and improve the sealing effect is also not applicable to large bearings.

Furthermore, effective state monitoring of the wind turbine bearings and sealing devices thereof is of great significance to ensure the safe and stable operation of the wind turbine generators. To this end, it is necessary to mount a variety of sensors on the wind turbine bearings to acquire state information, such as temperatures, vibrations, wear, and displacements, of the bearings and the sealing devices. However, since the bearings have complex structures and most members thereof are metal members, it is difficult to find suitable sensor mounting positions at the members of the bearings. Meanwhile, sealing rings made of rubber have poor stiffness and are easily twisted and deformed. Thus, the sealing rings are also unsuitable for mounting of the sensors.

SUMMARY OF THE INVENTION

Therefore, the object of the present application is to provide a sealing device that can be applicable to large bearings such as wind turbine bearings. The sealing device can provide a good sealing effect and preferably can support monitoring of operating state information of a wind turbine bearing and a sealing device thereof.

The above-mentioned object is implemented by a sealing device. The sealing device comprises: a sealing ring, comprising a sealing lip composed of an insulating elastic material and used for forming dynamic sealing with respect to a conductive component; support bodies, made of metal, wherein the support bodies are fixed on the sealing ring in a distributed manner along a circumferential direction of the sealing ring, and provide radial forces to the sealing lip against the conductive component; and a first detection unit, comprising two first support bodies in the support bodies, first cables respectively electrically connected to the corresponding first support bodies, and a loop detection device electrically connected to each first cable, wherein the first support bodies are arranged at the sealing ring in such a manner that radial ends of the first support bodies close to the conductive component are covered with an insulating elastic material at the sealing lip and can directly contact the conductive component after the sealing lip is worn, thus after the sealing lip is worn for a predetermined amount, the two first support bodies, the conductive component, the loop detection device, and the first cables jointly form a communication loop that can be detected by the loop detection device.

Here, the sealing device is preferably used for sealing between two components that rotate with respect to each other. Here, the sealing device can be mounted, particularly be mounted by an interference fit, on one of the components, and abut, by the above-mentioned sealing lip of the sealing ring thereof, against the other component, i.e., the conductive component, thereby forming contact-type dynamic sealing with respect to the other component, i.e., the conductive component.

In the scope herein, the sealing ring is composed of an insulating elastic material, preferably rubber, at least in a region of the above-mentioned sealing lip which is pressed against the conductive component by means of the support bodies. Preferably, the sealing ring is mainly made of rubber. The number of sealing lips of the sealing ring is not limited herein. In addition to the above-mentioned sealing lip that abuts against the conductive component by means of the support bodies, the sealing ring may further be configured with further sealing lips, and the further sealing lips may form contact-type or non-contact-type sealing with the conductive component. For convenience of illustration, in the following, unless otherwise stated, the sealing lip refers to the sealing lip that contacts the conductive component by means of the support bodies.

In the scope herein, a component forming dynamic sealing with the above-mentioned sealing lip is the conductive component. Here, the conductive component is preferably a component made of conductive metal or a component coated with a conductive coating at least on a surface forming the dynamic sealing.

Here, the sealing device comprises a plurality of support bodies made of metal and distributed along the circumferential direction. In a radial direction of the sealing ring, the support bodies each have a radial end that is close to the conductive component as a whole, i.e., a first radial end; and a radial end that is away from the conductive component as a whole, i.e., a second radial end. Preferably, the support bodies are fixed, by vulcanization, on the sealing ring preferably made of rubber. Preferably, the support bodies are partially or completely covered with the insulating elastic material. The support bodies preferably provide, by their own structures, radial forces to the sealing ring against a component on a radially outer side, such as a bearing outer ring; and a component on a radially inner side, such as a bearing inner ring. In this case, the sealing lip of the sealing ring can stably abut against the conductive component, thereby being able to improve the sealing effect. Preferably, the plurality of support bodies are evenly distributed at the sealing ring along the circumferential direction. Here, the provision of spring coils in the prior art is avoided, and the manufacturing process is simplified. In addition, since the plurality of support bodies are provided in the circumferential direction of the sealing ring, the sealing device may better match large bearings, such as fan bearings, thereby reducing, and even avoiding potential problem of eccentricity in applications of the large bearings.

Here, the sealing device comprises first detection units. The first detection units are particularly used for detecting a degree of wear of the sealing lip. The first detection units each comprise two particularly designed and arranged support bodies, i.e., two first support bodies. Here, first radial ends of the first support bodies are arranged at a lip opening of the sealing lip, wherein the first radial ends of the first support bodies are covered with the insulating elastic material constituting the sealing lip or are embedded inside the insulating elastic material of the sealing lip when the sealing device is delivered from a factory or in an early stage of the service life of the sealing device, such that at least one first support body, preferably two first support bodies, is insulated with respect to the conductive component when the sealing lip contacts the conductive component. In this case, the insulating elastic material at the first radial ends of the first support bodies is designed in such a manner that after the sealing lip is worn for a predetermined amount, the corresponding first radial ends of the two first support bodies can both directly contact the conductive component, thereby being able to implement a conductive path. Here, whether the two first support bodies and the conductive component located between the two first support bodies form the conductive path can be identified by means of the loop detection device, thereby determining whether the sealing ring has wear-out failure or determining a possibility of wear-out failure; and then relevant measures can be taken in a timely manner. It should be noted that the specific solution of the loop detection device is not limited herein. Those skilled in the art can configure the loop detection device in any reasonable manner according to the prior art, so as to identify an off or on state of a circuit. In some possible implementations, the loop detection device is arranged in equipment where the sealing device is located, such as a wind turbine generator. In some possible implementations, the loop detection device further comprises a wireless communication module for transmitting wear state information of the sealing ring, thereby being able to implement remote monitoring of, for example, a sealing device of a wind turbine bearing. Here, a wear state of the sealing lip can be monitored by using the support bodies that provide the radial forces to the sealing ring, which avoids additionally providing a wear detection device, and facilitates the simplification of an overall structure of the sealing device.

In one advantageous implementation, the sealing lip is configured on the radially inner side of the sealing ring. In this case, the sealing device, particularly a head of the sealing ring, can be fixedly mounted on a component located on the radially outer side of the sealing device, such as the bearing outer ring, or a housing such as a bearing seat; and the sealing lip of the sealing ring contacts the conductive component on the radially inner side, such as the bearing inner ring, or a shaft member.

In an alternative implementation, the sealing lip is configured on the radially outer side of the sealing ring. In this case, the sealing device, particularly the head of the sealing ring, can be fixedly mounted on a component on the radially inner side of the sealing device, such as the bearing inner ring, or the shaft member; and the sealing lip of the sealing ring slidably contacts the conductive component on the radially inner side, such as the bearing outer ring, or a housing such as the bearing seat.

In one preferred implementation, the sealing ring further comprises a fabric portion, wherein the fabric portion is arranged at a radial end of the sealing ring away from the conductive component. Thus, the strength of the sealing ring may be enhanced by means of fiber fabrics of the fabric portion, and the assembling of the sealing ring is facilitated.

In one preferred implementation, the support bodies are composed of bent plate springs. The plate springs are particularly made of spring steel. Preferably, the bending of the support bodies matches the radial extension of the sealing ring. In this case, the support bodies can be implemented at low costs, and the radial forces provided by the support bodies can be easily designed.

In one preferred implementation, the first radial ends of the first support body are configured as at least one strip portion extending substantially along a radial direction. The first radial ends of the first support body are configured as two, three or four strip portions extending substantially along the radial direction. Thus, contact areas between the first radial ends of the first support bodies and the conductive component after the sealing lip is worn are reduced, thereby reducing friction damage to the conductive component as much as possible. Preferably, the first radial ends of the first support body are configured as at least two strip portions extending substantially along the radial direction, thereby ensuring the contact stability of the first radial ends at the conductive component while ensuring small contact areas between the first radial ends of the first support bodies and the conductive component.

In one preferred implementation, the two first support bodies of the first detection unit are adjacently arranged. In this case, no further support body is provided between the two first support bodies. Thus, a wear position of the sealing ring is easily and accurately identified.

In one preferred implementation, the sealing device comprises at least two first detection units arranged along the circumferential direction of the sealing ring. In this case, wear state information of the sealing ring at a plurality of positions in the circumferential direction can be acquired in a more comprehensive manner.

In one preferred implementation, the sealing device further comprises second detection units, wherein the second detection units each comprise a second support body in the support bodies and a sensor supported by the second support body. In this case, the second support bodies are particularly configured with accommodating structures, such as accommodating holes, for supporting and at least partially accommodating the sensors. In this case, at least sensing sections of the sensors can be arranged in the accommodating structures. Thus, the second support bodies can further support the sensors while providing the radial forces to the sealing ring, the sensors are prevented from being mounted at a metal component, such as a bearing member, the mounting of the sensors is simplified, and the problem that the insulating elastic material of the sealing ring, such as a rubber material, is not stiff enough to support the sensors is also solved. Here, equipment where the sealing device is mounted, such as a wind turbine bearing, has a high degree of structural integration, and requires a small space for arrangement. Here, optionally, the second detection units further comprise second cables electrically connected to the sensors. By means of the second cables, for example, power can be supplied to the sensors, and operating state information, measured by the sensors, of the bearing or the sealing device can be transmitted. Alternatively, wireless sensors may be used as the sensors of the second detection units. Thus, there is no need to additionally provide a power supply and/or data transmission line.

In one preferred implementation, the sensors are temperature sensors, vibration sensors, or rotational speed sensors. Here, necessary state monitoring information concerning the operation of the bearing can be acquired.

In one preferred implementation, the sealing device comprises at least two second detection units arranged along the circumferential direction of the sealing ring. Here, optionally, operating state information of a same type can be acquired at different positions in the circumferential direction of the sealing device or the bearing, for example, temperature measurement can be performed at different positions in the circumferential direction. Alternatively or additionally, a variety of sensors of different types may be integrated in a same sealing device, thereby being able to simultaneously acquire a variety of state information concerning the operation of the bearing.

In conclusion, the sealing effect can be improved by providing radial forces to the sealing ring by a plurality of metal support bodies provided in the circumferential direction of the sealing ring. Preferably, the support bodies can further serve as constituent parts of detection units for detecting wear of the sealing ring. Additionally, the support bodies can further serve as support carriers for a plurality of sensors. Thus, monitoring of an operating state of the bearing or the sealing device can be easily implemented, and an overall structure of the bearing and the sealing device can be implemented in a compact manner.

BRIEF DESCRIPTION OF THE DRAWINGS

Features, advantages, and technical effects of exemplary embodiments of the present application will be described below with reference to the accompanying drawings.

DETAILED DESCRIPTION OF EMBODIMENTS

Figure 1:
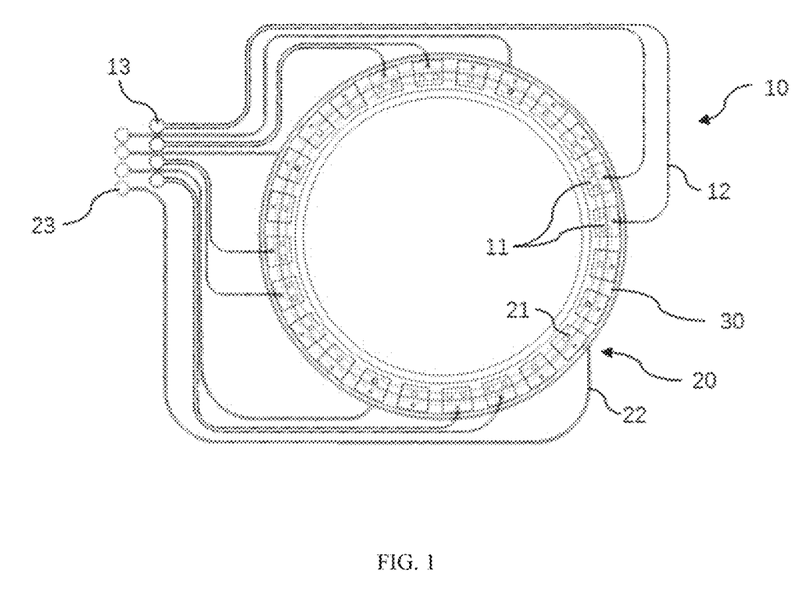
FIG. 1 is a schematic diagram of a sealing device according to one preferred implementation.

FIG. 1 shows a schematic diagram of a sealing device according to one preferred implementation. The sealing device in the present implementation can be used for sealing a wind turbine bearing.

As shown in FIG. 1, the sealing device comprises a sealing ring 30, support bodies evenly distributed along a circumferential direction of the sealing ring 30, first detection units 10, and second detection units 20.

Figure 3:
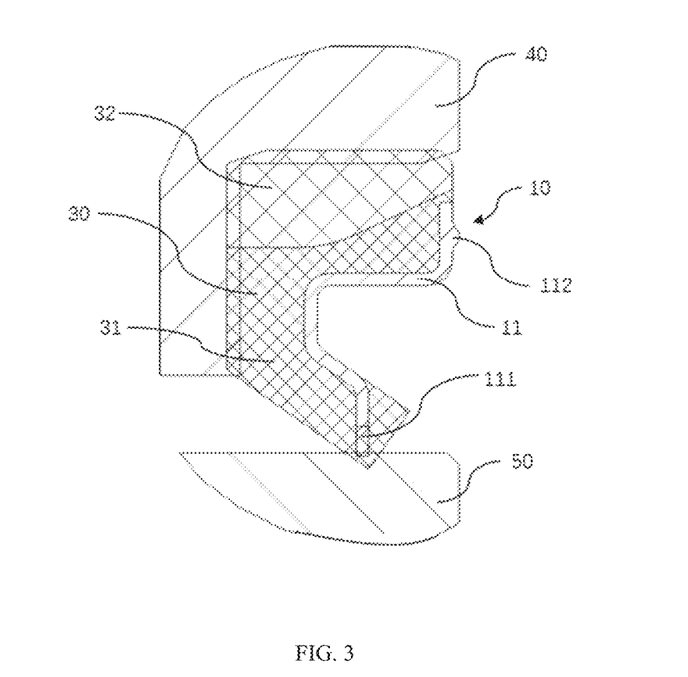
FIG. 3 is a partial cross-sectional view, at the first support body, of the sealing device according to FIG. 1 in a first state.
Figure 4:
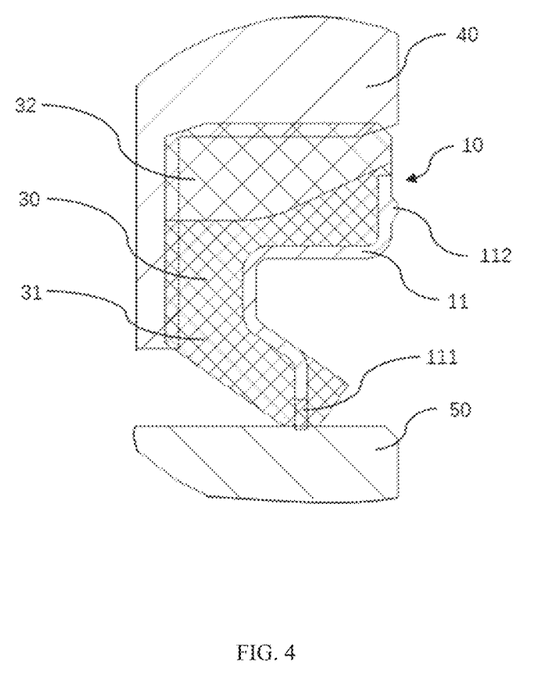
FIG. 4 is a partial cross-sectional view, at the first support body, of the sealing device according to FIG. 1 in a second state.

In the present implementation, the sealing ring 30 comprises an annular elastic sealing body 31 composed of rubber and a fabric portion 32 connected to a radially outer side of the elastic sealing body 31, as shown in the partial cross-sectional views of the sealing device in an assembled state as shown in FIG. 3 and FIG. 4. The sealing ring 30 is assembled at an outer ring 40 of a wind turbine bearing by an interference fit via the fabric portion 32. The elastic sealing body 31 of the sealing ring 30 is configured with a sealing lip on a radially inner side, and the sealing lip abuts against an outer peripheral surface of an inner ring 50, made of metal, of the wind turbine bearing, thereby forming contact-type dynamic sealing.

Figure 2:
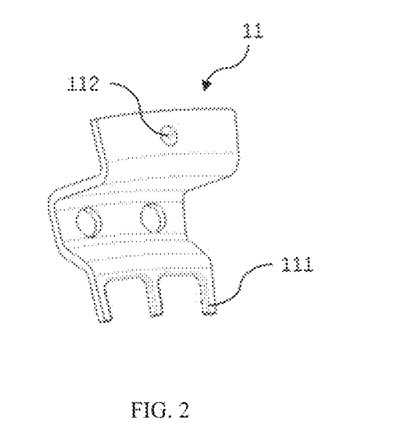
FIG. 2 is a perspective view of a first support body of the sealing device according to FIG. 1.

In the present implementation, the support bodies are composed of bent plate springs, wherein the plate springs are particularly made of spring steel. Here, the common features of all the support bodies in the present implementation are explained with reference to the first support bodies 11 shown in FIG. 2, FIG. 3 and FIG. 4, and differences among different support bodies will be explained in details later. As shown in FIG. 2 to FIG. 4, the bending of the support bodies 11 matches the extension of the sealing ring 30, particularly the elastic sealing body 31. The support bodies 11 are fixed, by vulcanization, on the sealing ring 30 preferably made of rubber, particularly the elastic sealing body 31. The support bodies 11 each have a radial end on a radially inner side of the sealing ring 30, i.e., a first radial end 111; and a radial end on a radially outer side of the sealing ring 30, i.e., a second radial end 112. By means of potential energy stored in the plate springs constituting the support bodies 11, radial forces can be provided to the sealing ring 30, such that a head of the sealing ring 30 can be pressed against the outer ring 40, and thus the stability of an interference fit between the sealing ring 30 and the outer ring 40 is enhanced; and the sealing lip, preferably a main lip, of the sealing ring 30 is made to be reliably pressed against the inner ring 50, and thus a sealing effect of the sealing ring can be improved. In addition, the sealing device better matches large bearings, such as fan bearings, thereby reducing, and even avoiding potential problem of eccentricity in large bearings.

The first detection units 10 are particularly used for detecting a degree of wear of the sealing lip. As shown in FIG. 1, in the present implementation, the first detection units each comprise two adjacently arranged support bodies, i.e., first support bodies 11, first cables 12 respectively electrically connected to second radial ends 112 of the corresponding first support bodies 11, and a loop detection device 13 electrically connected to each first cable 12.

FIG. 3 shows a partial cross-sectional view, at the first support body 11, of the sealing device in an unworn or slightly worn state. Correspondingly, FIG. 4 shows a partial cross-sectional view, at the first support body 11, of the sealing device in a severely worn state. As shown in FIG. 3, in the present implementation, the support bodies 11 are partially covered with an insulating elastic material. Specifically, the second radial ends 112 of the first support bodies 11 are exposed to a surface of the elastic sealing body 31 of the sealing ring 30, and the first radial ends 111 of the first support bodies 11 are covered with a rubber material or are embedded inside the rubber material of the sealing lip in an early stage of the service life of the sealing device, such that the first support bodies 11 are insulated with respect to the inner ring 50 when the sealing lip contacts the inner ring 50. In this case, the rubber material at the first radial ends 11 of the first support bodies 11 is designed in such a manner that after the sealing lip is worn for a predetermined amount, as shown in FIG. 4, the corresponding first radial ends 111 of the two first support bodies 11 can both directly contact a surface of the inner ring 50, such that the two first support bodies 11 and the inner ring 50 located between the two first support bodies can establish a conductive path.

Here, whether the two first support bodies 11 and the inner ring 50 located between the two first support bodies form the conductive path is detected by means of the loop detection device 13, thereby determining whether the sealing ring 30 has wear-out failure or determining a possibility of wear-out failure; and then relevant measures can be taken in a timely manner. Particularly, as shown in FIG. 1, in the present implementation, the loop detection device can be configured as an indicator light with a power supply device. When the sealing lip is unworn or slightly worn, the indicator light goes out; and when the sealing lip is severely worn to cause the two first support bodies 11 to directly contact the inner ring 50, an energized loop can be formed, and at this time, the indicator light lights up. It can be understood that those skilled in the art can configure the loop detection device in any reasonable manner according to the prior art, so as to identify an off or on state of a circuit.

According to the present implementation, particularly as shown in the perspective view of the first support body 11 of the sealing device as shown in FIG. 2, the first radial ends 111 of the first support body 11 are configured to be multiple, here, three strip portions extending substantially along a radial direction. Thus, contact areas between the first radial ends 111 of the first support bodies 11 and the inner ring 50 after the sealing lip is worn are reduced, thereby reducing friction damage to the inner ring 50 as much as possible, and ensuring the contact stability of the first radial ends 111 at the inner ring 50.

According to the present implementation, the sealing device further comprises second detection units 20. The second detection units 20 each comprise a second support body 21 in the support bodies, and a sensor 24 supported by the second support body 21.

Figure 5:
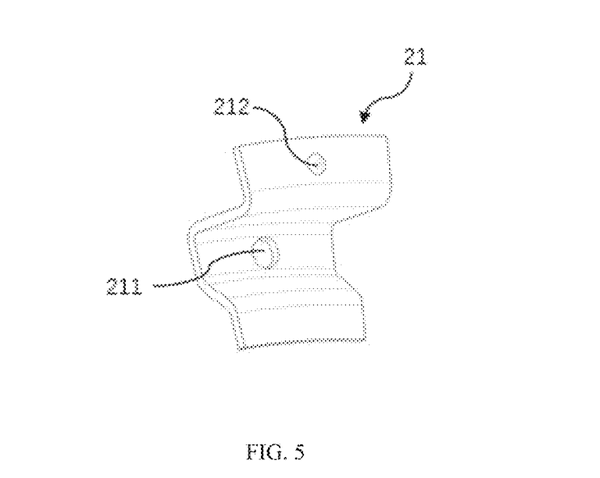
FIG. 5 is a perspective view of a second support body of the sealing device according to FIG. 1.
Figure 6:
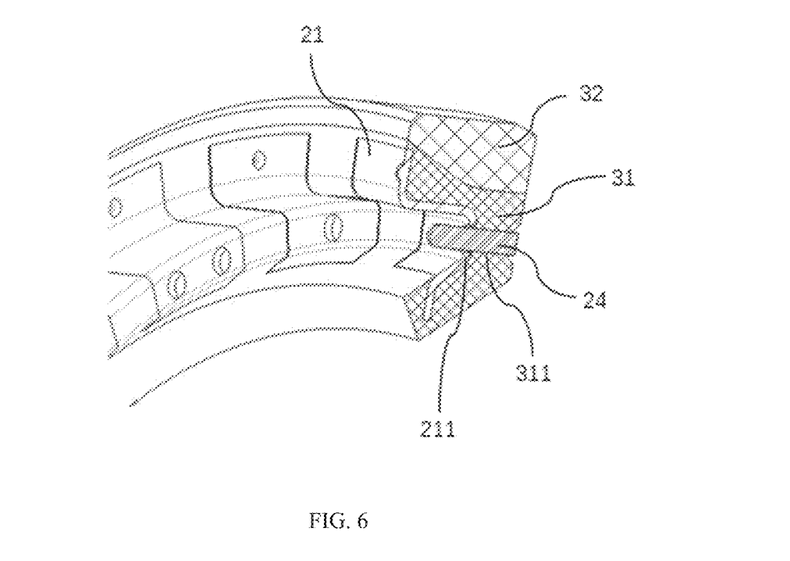
FIG. 6 is a perspective cross-sectional view, at the second support body, of the sealing device according to FIG. 1.

Here, FIG. 5 shows a perspective view of the second support body 21 of the sealing device; and FIG. 6 shows a perspective cross-sectional view, at the second support body 21, of the sealing device. As shown in FIG. 5 and FIG. 6, the second support bodies 21 are, with respect to the other support bodies, additionally configured with accommodating holes 211 for supporting and at least partially accommodating the sensors 24. The sensors 24 can be, for example, temperature sensors, vibration sensors, or rotational speed sensors. Thus, the second support bodies 21 can further serve as support carriers for the sensors 24 while providing radial forces to the sealing ring 30. It can be understood that, according to specific sizes and structures of the sensors, the elastic sealing body 31 of the sealing ring 30 is also accordingly configured with an accommodating portion 311 for accommodating the sensors 24. Therefore, the sensors 24 are prevented from being mounted at a metal component, such as a bearing member, and the mounting of the sensors is simplified. In the present implementation, the second detection units 20 further comprise second cables 22 electrically connected to the sensors 24. By means of the second cables 22, power can be supplied to the sensors 24, and state information, measured by the sensors, of the bearing or the sealing device can be transmitted to a signal processing unit 23.

Referring to FIG. 1 again, according to the present implementation, the sealing device comprises a plurality of first detection units 10 and a plurality of second detection units 20. By providing the plurality of first detection units 10, wear state information of the sealing ring 30 at a plurality of positions in the circumferential direction can be acquired in a more comprehensive manner. In addition, a variety of sensors of different types are integrated in the sealing device by means of the plurality of second detection units 20, thereby being able to simultaneously acquire a variety of state information concerning the operation of the bearing. Thus, monitoring of an operating state of the bearing or the sealing device can be easily implemented, and an overall structure of the bearing and the sealing device can be implemented in a compact manner.

In addition, it can be understood that the support bodies may further comprise a third support body that is different from the first support bodies and the second support bodies. Here, the third support body is mainly to provide a radial force, and does not participate in the monitoring of the operating state of the bearing or the sealing device. It can be further understood that there can be a support body that integrates functions and structures of the first support bodies and the second support bodies, i.e., the support body is configured with a support carrier for supporting the sensor and can constitute a constituent part of a wear detection unit.

Obviously, the above-mentioned embodiments of the present disclosure are only exemplary in order to clearly describe the present disclosure, rather than limiting the implementations of the present disclosure. For those of ordinary skill in the art, other different forms of changes or alterations can be made based on the above-mentioned description. An exhaustive list of all implementations is neither necessary nor possible. Any modifications, equivalent replacements and improvements made within the spirit and principle of the present disclosure shall be included within the protection scope of the claims of the present disclosure. For example, shapes of the sealing ring 30 and the support bodies 11 and 12 are not limited to the embodiments shown in the drawings, and arrangement modes of the first detection units and the second detection units in the sealing device are also not limited to the embodiments shown in the drawings. Other solutions that adequately solve the above-mentioned technical problems are also within the protection scope of the present disclosure.

In the description herein, it should be noted that, unless otherwise explicitly specified and limited, the terms "axial direction", "radial direction" and "circumferential direction" are all based on a central axis of the sealing ring. Specifically, the "axial direction" is an extension direction of the central axis of the sealing ring or a direction extending in parallel to the central axis; the "radial direction" is a direction perpendicular to the central axis of the sealing ring and intersecting the central axis; and the "circumferential direction" is a direction around the central axis of the sealing ring.

Furthermore, the terms "first" and "second" are used for descriptive purposes only and should not be understood as indicating or implying relative importance.

LIST OF REFERENCE NUMERALS

10 First detection unit
11 First support body
111 First radial end
112 Second radial end
12 First cable
13 Loop detection device
20 Second detection unit
21 Second support body
22 Second cable
23 Signal processing unit
24 Sensor
30 Sealing ring
31 Elastic sealing body
32 Fabric portion

The invention claimed is:
1. A sealing device comprising:
a sealing ring comprising a sealing lip composed of an insulating elastic material and used for forming dynamic sealing with respect to a conductive component, the sealing ring comprising a fabric portion, wherein the fabric portion is arranged on a radial end of the sealing ring away from the conductive component;

support bodies made of metal, wherein the support bodies are fixed on the sealing ring in a distributed manner along a circumferential direction of the sealing ring, and provide radial forces to the sealing lip against the conductive component; and a first detection unit comprising two first support bodies in the support bodies, first cables respectively electrically connected to the corresponding first support bodies, and a loop detection device electrically connected to each first cable, wherein the first support bodies are arranged at the sealing ring in such a manner that radial ends of the first support bodies close to the conductive component are covered with an insulating elastic material at the sealing lip and can directly contact the conductive component after the sealing lip is worn, thus after the sealing lip is worn for a predetermined amount, the two first support bodies, the conductive component, the loop detection device, and the first cables jointly form a communication loop that can be detected by the loop detection device.

2. The sealing device according to claim 1, wherein the sealing lip is configured on a radially inner side of the sealing ring.

3. The sealing device according to claim 1, wherein the support bodies are composed of bent plate springs.

4. The sealing device according to claim 3, wherein a first radial end of the first support body is configured as at least one strip portion extending substantially along a radial direction.

5. The sealing device according to claim 1, wherein the two first support bodies of the first detection unit are adjacently arranged.

6. The sealing device according to claim 1, wherein the sealing device comprises at least two first detection units arranged along the circumferential direction of the sealing ring.

7. The sealing device according to claim 1, wherein the sealing device further comprises second detection units, wherein the second detection units each comprise a second support body in the support bodies and a sensor supported by the second support body.

8. The sealing device according to claim 7, wherein the sensor are temperature sensors, vibration sensors, and/or rotational speed sensors.

9. The sealing device according to claim 7, wherein the sealing device comprises at least two second detection units arranged along the circumferential direction of the sealing ring.

10. A sealing device comprising:
a sealing ring, wherein the sealing ring is insulative and is configured to form a dynamic seal to a conductive component, the sealing ring comprising a fabric portion, wherein the fabric portion is arranged on a radial end of the sealing ring away from the conductive component;
a plurality of support bodies, wherein the plurality of support bodies are fixed on the sealing ring along a circumferential direction of the sealing ring, wherein the plurality of support bodies provide a radial force between the sealing lip and the conductive component; and
a first detection unit, wherein the first detection unit comprises two or more first support bodies from the plurality of support bodies, two or more first cables respectively electrically connected to corresponding two or more first support bodies, and a loop detection device electrically connected to each of the two or more first cables;
wherein the two or more first support bodies are arranged at the sealing ring and radial ends of the two or more first support bodies are covered with an insulating elastic material at the sealing lip, wherein the two or more first support bodies, the conductive component, the loop detection device, and the two or more first cables form a communication loop.

11. The sealing device according to claim 10, wherein the sealing lip is positioned on an inner side of the sealing ring.

12. The sealing device according to claim 10, wherein one or more of the support bodies comprise one or more bent plate springs.

13. The sealing device according to claim 10, wherein the two or more first support bodies of the first detection unit are adjacently arranged.

14. The sealing device according to claim 10, wherein the sealing device comprises at least two first detection units arranged along the circumferential direction of the sealing ring.

15. The sealing device according to claim 10, wherein the sealing device comprises a second detection unit, wherein the second detection unit comprises a second support body of the plurality of support bodies and a sensor supported by the second support body.

16. The sealing device according to claim 15, wherein the sensor comprises at least one of a temperature sensor, a vibration sensor, or a rotational speed sensor.

17. The sealing device according to claim 10, wherein the sealing device comprises at least two second detection units arranged along the circumferential direction of the sealing ring.

18. A wind turbine comprising:
one or more bearings; and
one or more sealing devices, wherein at least one of the one or more sealing devices comprise:
a sealing ring, wherein the sealing ring is insulative and is configured to form a dynamic seal to a conductive component, the sealing ring comprising a fabric portion, wherein the fabric portion is arranged on a radial end of the sealing ring away from the conductive component;
a plurality of support bodies, wherein the plurality of support bodies are fixed on the sealing ring along a circumferential direction of the sealing ring, wherein the plurality of support bodies provide a radial force between the sealing lip and the conductive component; and
a first detection unit, wherein the first detection unit comprises two or more first support bodies from the plurality of support bodies, two or more first cables respectively electrically connected to corresponding two or more first support bodies, and a loop detection device electrically connected to each of the two or more first cables;
wherein the two or more first support bodies are arranged at the sealing ring and radial ends of the two or more first support bodies are covered with an insulating elastic material at the sealing lip, wherein the two or more first support bodies, the conductive component, the loop detection device, and the two or more first cables form a communication loop.

\* \* \* \* \*